(12) United States Patent
Yegneswaran et al.

(10) Patent No.: US 8,015,605 B2
(45) Date of Patent: Sep. 6, 2011

(54) SCALABLE MONITOR OF MALICIOUS NETWORK TRAFFIC

(75) Inventors: Vinod T. Yegneswaran, Foster City, CA (US); Paul R. Barford, Madison, WI (US); David J. Plonka, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1444 days.

(21) Appl. No.: 11/214,399

(22) Filed: Aug. 29, 2005

(65) Prior Publication Data
US 2007/0067841 A1   Mar. 22, 2007

(51) Int. Cl.
*G06F 11/00* (2006.01)
*G06F 12/14* (2006.01)
(52) U.S. Cl. ............. 726/22; 726/23; 726/24; 713/187; 713/188
(58) Field of Classification Search ............... 726/23, 726/24, 25
See application file for complete search history.

(56) References Cited

U.S. PATENT DOCUMENTS

| | | | |
|---|---|---|---|
| 7,124,438 B2 * | 10/2006 | Judge et al. | 726/22 |
| 7,162,742 B1 * | 1/2007 | Flowers et al. | 726/25 |
| 7,272,646 B2 * | 9/2007 | Cooper et al. | 709/223 |
| 7,540,025 B2 * | 5/2009 | Tzadikario | 726/22 |
| 7,607,010 B2 * | 10/2009 | Cavanaugh | 713/165 |
| 2003/0196095 A1 * | 10/2003 | Jeffries et al. | 713/181 |
| 2006/0064755 A1 * | 3/2006 | Azadet et al. | 726/24 |
| 2006/0294590 A1 * | 12/2006 | Enstone et al. | 726/24 |

OTHER PUBLICATIONS

Michael Vrable, et al.., Scalability, Fidelity, and Containment in the Potemkin Virtual Honeyfarm, SOSP'05, Oct. 23-26, 2005, Brighton, United Kingdom.*
Michael Vrable, et al., Scalability, Fidelity, and Containment in the Potemkin Virtual Honeyfarm, SOSP'05, Oct. 23-26, 2005, Brighton, United Kingdom.
Michael Bailey, et al., The Internet Motion Sensor: A Distributed Blackhole Monitoring System, University of Michigan, Aug. 2003, Dec. 2003, Arbor Networks.
Evan Cooke, et al., Toward Understanding Distributed Blackhole Placement, WORM'04, Oct. 29, 2004, Washington, D.C.
Christian Kreibich, et al., Honeycomb—Creating Intrusion Detection Signatures Using Honeypots, ACM SIGCOMM Computer Communications Review, vol. 34, No. 1, Jan. 2004.
Sumeet Singh, et al., The EarlyBird system for Real-Time Detection of Unknown Worms, Submitted to Hotnetts-II, University of California, San Diego.
Niels Provos, A Virtual Honeypot Framework, 13th USENIX Security Symposium, University of Michigan.
Hyang-Ah Kim, et al., Autograph: Toward Automated, Distributed Worm Signature Detection, 13th USENIX Security Symposium, Carnegie Mellon University.

* cited by examiner

*Primary Examiner* — Nasser Moazzami
*Assistant Examiner* — Fikremariam Yalew
(74) *Attorney, Agent, or Firm* — Boyle Fredrickson, S.C.

(57) ABSTRACT

A monitor of malicious network traffic attaches to unused addresses and monitors communications with an active responder that has constrained-state awareness to be highly scalable. In a preferred embodiment, the active responder provides a response based only on the previous statement from the malicious source, which in most cases is sufficient to promote additional communication with the malicious source, presenting a complete record of the transaction for analysis and possible signature extraction.

28 Claims, 3 Drawing Sheets

SCALABLE MONITOR OF MALICIOUS NETWORK TRAFFIC

STATEMENT REGARDING FEDERALLY SPONSORED RESEARCH OR DEVELOPMENT

This invention was made with United States government support awarded by the following agencies: DOD ARPA DAAD19-02-1-0304. The United States has certain rights in this invention.

BACKGROUND OF THE INVENTION

The present invention relates to computer network security, and in particular to a method and apparatus for collecting samples of malicious traffic on a network for the purpose of monitoring and analyzing malicious traffic and possibly developing signatures and/or countermeasures used to identify and block malicious traffic.

Computer networks are increasingly subject to attacks from malicious network traffic containing software (exploits) such as "worms," which steal processing time on individual computers to further propagate the exploit to other computers on the network. Worms and similar exploits disrupt the network by consuming network bandwidth and may steal or damage programs and data on computers.

Referring to FIG. 1, a computer network 10 may connect to an "external" network 12 such as the Internet, through a network connection 14 having at least one network address. Data packets 16 and 17 may be exchanged between two computers (not shown) on networks 12 and 10 according to a number of well-known protocols such as HTTP, NetBIOS/SMB, and DCERPC (the Windows RPC service).

A "network intrusion detection system" 22 (NIDS) can be attached to the network interface 14 to monitor the data packets 16 and 17 flowing between networks 10 and 12. As used herein, data packets 16 from a potentially malicious source will be termed "statements" and data packets 17 from the potential target computer shall be termed "responses". The NIDS 22 compares the data of both statements 16 and responses 17 to a library of "data signatures" 23 stored in the NIDS 22, each data signature 23 capturing a pattern of statements 16 and responses 17 associated with malicious network traffic. When a series of statements 16 and responses 17 monitored by the NIDS 22 match a stored signature 23, an alert is produced on an output 24 to notify the system administrator or to enable blocking features in a firewall 26 or the like.

Different types of malicious network traffic attack different security weaknesses associated with different types of operating systems and different network software executing different communication protocols. Each type of malicious network traffic may also have variants representing often trivial modifications to the statements 16. These variants are intended to defeat a signature-based NIDS 22 and are constantly evolving. For this reason, the data signatures 23 used by the NIDS 22 must be constantly updated.

Signatures 23 for an NIDS 22 may be created from samples of malicious traffic that have been collected and analyzed. Co-pending U.S. application Ser. No. 11/085,633 filed Mar. 21, 2005 and hereby incorporated by reference, describes a system of analyzing malicious network traffic to automatically generate signatures that may be used by an NIDS-type system.

Samples of malicious network traffic can be obtained through the use of a "honeypot" (a system with no authorized activity that is deployed for the purpose of traffic monitoring or being compromised) or a "honeynet" (a network of honeypot systems) set up to simulate a target for malicious network traffic. Data from honeynets can be valuable for analyzing attack profiles and malicious programs themselves. Since honeypots are live systems, they provide responses to malicious statements that match those that would be provided by a genuine network-connected computer to promote further communication with the exploit allowing better identification and analysis. The honeypots deployed for monitoring only, to the extent possible, are "fully patched," that is, equipped with the defenses against the anticipated malicious traffic so that they are not themselves infected. Honeypots are typically deployed on network "dark space," that is, a network with routable addresses but otherwise unpopulated with legitimate hosts, and thus largely free of benign network traffic, therefore simplifying the determination that traffic is malicious.

Early detection of new malicious traffic variants can be facilitated by monitoring a large number of addresses increasing the probability of detecting the malicious traffic in the earliest stages of its propagation. While a given honeypot may handle more than one IP address, for example, on the order of a dozen, honeypot monitoring of dark space for a typical network (e.g., greater than 10,000 addresses) is currently impractical. With changes in the Internet, for example to IPv6, which increases the address space from thirty-two to 128-bits, the ability to monitor a significant sampling of darkspace will become much more difficult.

BRIEF SUMMARY OF THE INVENTION

The present inventors have determined that in most cases a honeypot need not faithfully imitate an operating computer executing a standard network protocol, and that in many cases, a suitable response to a malicious statement may be generated directly from the current malicious statement in isolation without identifying the significance of the statement within the recognized states of a communication protocol.

By eliminating the requirement that the honeypot execute the actual communication protocol, a high degree of scalability is provided. For example, a response to a malicious statement may be generated by a small set of rules or a look-up table reducing the required processing and memory resources used by each honeypot and eliminating unnecessary system calls and interrupt handling overheads. As a result, a single computer may handle thousands of times more connections than a standard honeypot system that faithfully replicates a complete communication protocol. Further, and importantly, by eliminating faithful adherence to the communication protocol and its states, the honeypot is largely immunized against exploitation by the malicious traffic it is monitoring.

Specifically then, the present invention provides a monitor for malicious network traffic, the monitor having a network interface for receiving malicious communications comprised of a series of statements where the statements conform at least in part to a communication protocol defined by a series of communication states. A constrained-state-awareness responder creates a response to a given statement based on at least one given statement and a number of previous statements less than that required to determine a position of the given statement within the series of communication states. A monitor records the series of statements.

Thus it is one object of at least one embodiment of the invention to provide a monitor that may simulate communication by an actual computer, but which requires far fewer processing resources and thus, which may be readily scaled to monitoring large numbers of network addresses.

The constrained-state-awareness responder may create a response based on the given statement and no previous statement. That is, the number of previous statements used by the constrained-state-awareness responder may be zero.

Thus it is an object of at least one embodiment of the invention to provide a monitor that may generate responses with a minimum necessary amount of processor resources.

The constrained-state-awareness responder may not be able to execute the communication protocol.

Thus it is another object of at least one embodiment of the invention to provide a responder that is unlikely to be infected by malicious traffic.

The constrained-state-awareness responder may parse the given statement to extract a subset of the statement, and the response to a given statement may be based on a subset of the given statement and a subset of a given number of previous statements.

Thus it is an object of at least one embodiment of the invention to allow the constrained-state-awareness responder to prune irrelevant data from a statement to improve the accuracy of the constrained-state-awareness responder despite its limited awareness of the communication state and/or to reduce the number of different statements that it must address.

The constrained-state-awareness responder may extract the subset of the statement according to a communication protocol used by the statement, such communication protocol, for example, being inferred from a port on which the statement is received.

Thus it is an object of at least one embodiment of the invention to provide a network monitor that works across different communication protocols and different operating systems assumed by the malicious traffic. It is a further object of at least one embodiment of the invention to improve accuracy in generating a response with limited contextual understanding of that response.

The constrained-state-awareness responder may be augmented with a real-time alert or periodic data summary generation system that can be used to notify security administrators of current and/or significant activity in the network.

Thus it is an object of at least one embodiment of the invention to provide a network monitor that includes an integrated capability to generate real-time alerts or periodic summaries of the activity detected by the monitor.

The invention may further include a filter between the network interface and the constrained-state-awareness responder, limiting communications from a given statement source.

It is thus another object of at least one embodiment of the invention to further improve the scalability of the system by allowing pre-filtering of data forwarded to the constrained-state-awareness responder. The combination of filter and constrained-state-awareness responder allows a flexible tradeoff between scalability and filtering/sampling to be obtained.

The filter may limit communication based on the identity of the source of the malicious statement or based on an address of the network interface.

Thus it is an object of at least one embodiment of the invention to provide two simple and highly scalable rules that may be used to limit the network traffic monitored under the assumption that a given source of malicious traffic will be using the same malicious exploit, and that provide the illusion of multiple targets on an address.

The filter may terminate communication once the signature of a known malicious communication type is identified.

Thus it is another object of at least one embodiment of the invention to increase the variety of malicious data that is monitored.

The network monitor may change the response created by the constrained-state-awareness responder to a given statement based on a historical analysis of acceptance of the response by a source of the given statement.

Thus it is an object of at least one embodiment of the invention to provide a system that may learn from malicious traffic over time.

A signature extractor may communicate with the monitor to extract signatures from the recorded statements for use in identifying malicious communications.

Thus it is an object of at least one embodiment of the invention to provide an integrated signature extractor.

The network interface may be attached to dark space. This can be on the ingress of a network as is typically done, and also on the egress of a network for the purpose of monitoring traffic that is directed toward IP addresses that would otherwise be unroutable (e.g., bogon address space).

It is thus an object of at least one embodiment of the invention to provide a source of malicious traffic without interfering with legitimate traffic that might be adversely affected by imperfect responses based on the limited-state-awareness responder of the present system.

These particular objects and advantages may apply to only some embodiments falling within the claims and thus do not define the scope of the invention.

DETAILED DESCRIPTION OF THE PREFERRED EMBODIMENT

Figure 1:
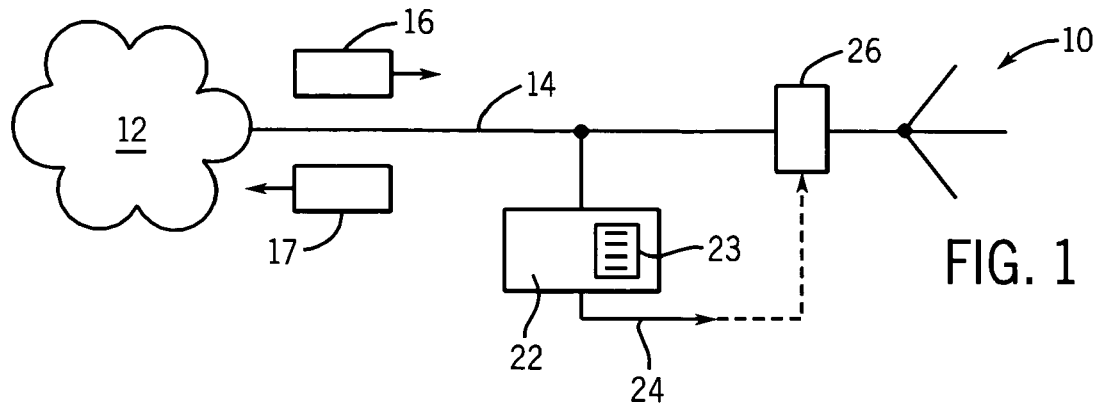
FIG. 1 is a diagram of a prior art network interface and network intrusion detection system (NIDS) connecting two networks and also useful in the present invention.
Figure 2:
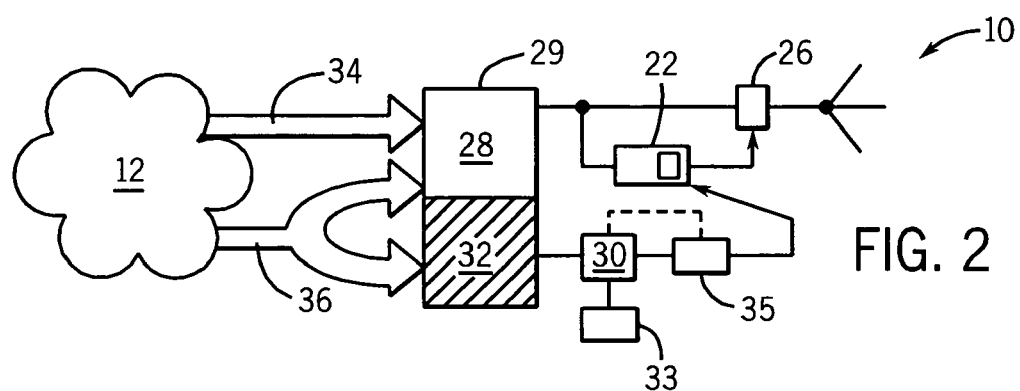
FIG. 2 is a view of the network interface of FIG. 1 in the context of address space, further showing the network monitor of the present invention together with a standard honeypot and a signature extractor all connected to a dark space portion of the address space.

Referring now to FIG. 2, the network 10 may communicate with the external network 12 at multiple addresses in address space 29, for example, a class A or B network having sixteen million and sixty-five thousand addresses, respectively. The address space 29 includes "bright space" addresses 28 used by standard network computers and dark space addresses 32 currently unused by standard network computers.

The bright space addresses 28 will receive generally both legitimate traffic 34 and malicious traffic 36 while the dark space addresses 32 will receive predominantly malicious traffic 36.

The network monitor 30 of the present invention may be connected to multiple dark space addresses 32. As will be described below, the network monitor 30 presents a façade to the network 12 having the appearance of a standard interface to multiple, functioning computers.

The network monitor 30 may communicate with a standard honeynet 33 comprised of multiple standard computers that are fully patched to be as resistant as possible to malicious attacks. The network monitor 30 may also communicate with a signature extractor 35 that may receive data from the network monitor 30, as will be described, to generate signatures associated with malicious traffic. The signatures may be provided to a NIDS 22 and may be used by the network monitor 30 as well.

Figure 3:
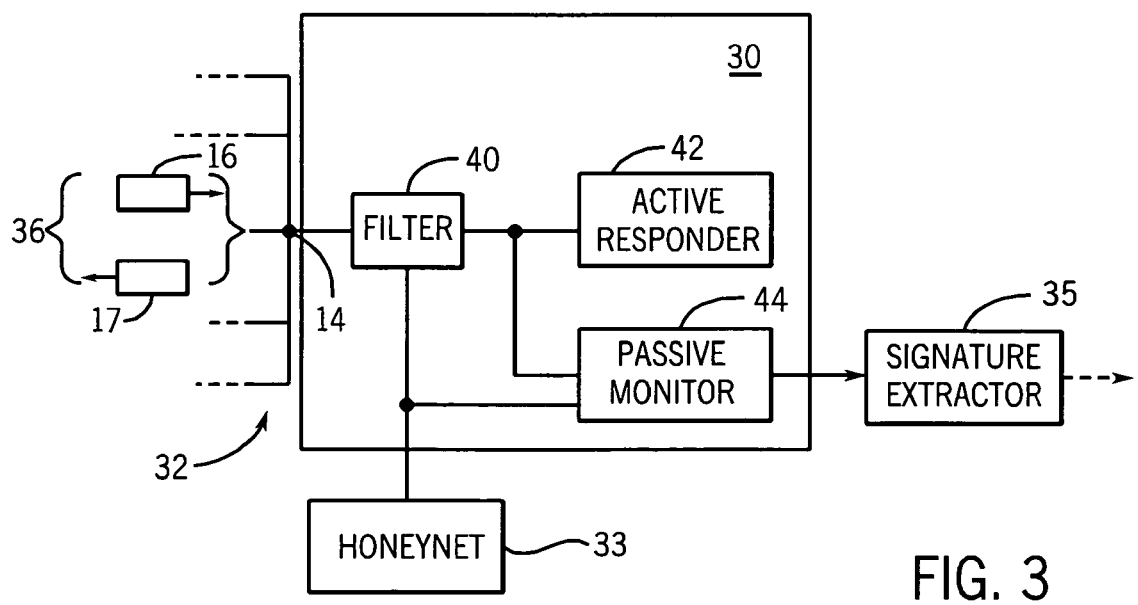
FIG. 3 is an expanded block diagram of the network monitor of FIG. 2 showing a filter, active responder and passive monitor of the network monitor.

Referring now to FIG. 3, the network monitor 30 includes a network interface 14 receiving statements 16 and providing responses 17 over multiple dark space addresses 32, as described. The predominantly malicious traffic 36 from the dark space addresses 32 passes through a filter 40 where it may be routed to the honeynet 33 or to an active responder 42. Depending on which way the malicious traffic 36 is routed, either the honeynet 33 or the active responder 42 will provide a response 17.

A passive monitor 44 monitors the communication with the honeynet 33 or active responder 42. Generally, with respect to the active responder 42, the passive monitor stores and records both the statements 16 and the responses 17. Optionally, an additional passive monitor tap can be placed at 14 which enables all traffic flowing into and out of the network monitor 30 to be captured. The passive monitor 44 may, for example, be based on Argus, a freely available open-source IP flow management tool available from Qosient, LLC at www.qosient.com/argus/. Other passive monitors providing similar functions may be used as will be evident from this description to one of ordinary skill in the art.

The filter 40 provides for optional reduction of traffic to the active responder and may route traffic to either the active responder 42 or the honeynet 33 using network address translation. The routing decision is based on the service being targeted and the observed behavioral history of the source address. The filter 40 may also use simple rules to increase the leverage of the active responder 42, for example, by allowing each source of malicious traffic 36 to have a limited number of connections, a limited number of connections per port, or to communicate with a limited number of network addresses. These rules are simply implemented and highly scalable, yet by allowing a given source of malicious traffic 36 to communicate with multiple endpoints defined by the communication protocol, IP addresses and port numbers, the illusion of a consistent network of computers may be provided.

Figure 4:
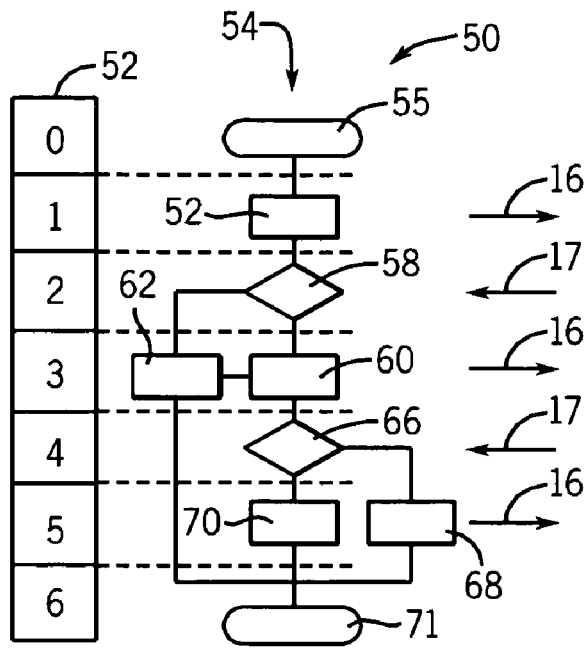
FIG. 4 is a simplified representation of a standard network communication protocol showing statements and responses associated with sequential states of the protocol.

Referring to FIG. 4, a standard communication protocol 54 usable on the networks 10 and 12 (shown in FIG. 2) may define a series of states 52 during which a statement 16 is produced or response 17 is expected. Transitions between the states 52 are governed by rules unique to the particular protocol 54 and operating system and represented in FIG. 4 by a greatly simplified flow chart.

An example standard communication protocol 54 may begin with the establishing of a connection 55 per state 0 followed by the generation of a statement 16 per state 1 having contents 57. A subsequent response 17 is interpreted in the communication protocol 54 at decision block 58 and state 2 to produce at state 3, a statement 16 having contents 60 or 62 depending on the resolution of decision block 58 of the previous state 2.

At state 4, a response 17 is received and parsed by decision block 66 to produce at state 5, one of two different statements 16 having content 68 or 70, again depending on the resolution of decision block 66 of the previous state 4. At state 6, the communication connection is terminated as indicated by termination block 71.

Normally providing the necessary responses 17 requires an understanding both of the rules 54 of the communication protocol 54 and of the particular state 52 associated with the response.

Figure 5:
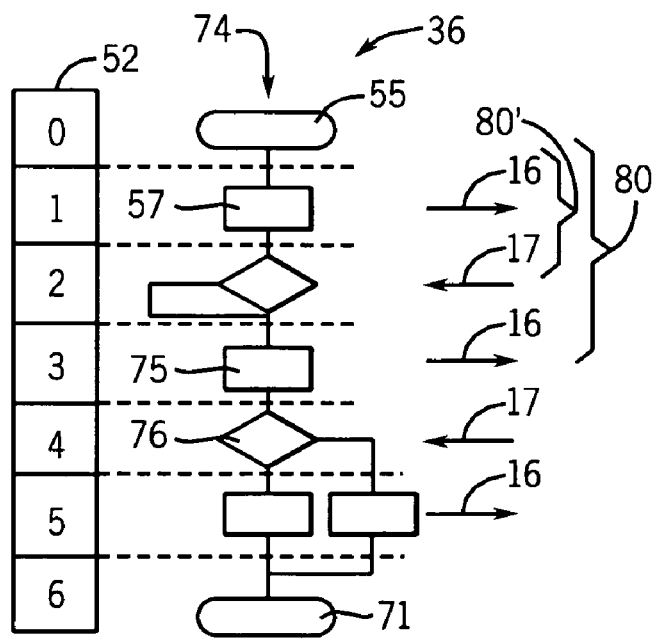
FIG. 5 is a figure similar to that of FIG. 4 showing the protocol and states of a malicious communication.

Referring now to FIG. 5, the present inventors have recognized that acceptable responses 17 may be generated without actual knowledge of the state 52 or even a complete knowledge of the rules 54. In part, this is because malicious traffic 36 adheres indifferently to the actual communication rules 54 and instead follows an abbreviated communication protocol 74. Thus for example, in the abbreviated communication protocol 74 of an exploit, a connection 55 may be created at state 0 followed by a statement 16 having content 57 at state 1, as before. But at state 2, the exploit may be indifferent to the response 17, in all cases following with a statement having content 75 at state 3. Thus the present invention has great latitude in providing a response 17 to the statement 16 of state 1, and in fact, in this case may provide any response because the exploit does not check the response.

Even in cases as indicated by decision block 76 at succeeding state 4, where the exploit of the malicious traffic 36 accurately follows the communication protocol 54 and analyzes a response 17 (e.g. in state 5) to produce different statements 16, in many cases, an appropriate response 17 may be generated simply by observing the previous statement 16 because of a high correlation of an appropriate response 17 to a previous statement 16 such as eliminates a need for an overarching understanding of the particular state or rules. Generally, a response 17 can be created based on a limited awareness of the actual state 52 of the abbreviated (or actual) communication protocol 74. This constrained-state-awareness can be represented by a limited-awareness window 80 encompassing a limited set of previous statements 16 and responses 17 insufficient to accurately identify the state 52. The limited-awareness window 80 enforces limitations on the storage or use of previous statements 16 and responses 17 and more generally may limit other information including knowledge of the particular protocol, connection or the like.

In the preferred embodiment, the limited-awareness window 80' covers only the single previous statement 16. Thus a response 17 is generated by looking at only the most immediate statement 16 as an argument. In this way, very little memory is required to effect the response 17, and thus the active responder 42 is highly scalable and may be implemented in a number of concurrently executing threads with little interference or use of processor resources.

It is important to note that the particular response 17 need not always be appropriate or acceptable to the exploit because the intent is to monitor malicious traffic and some failures can be tolerated on a statistical basis. Further, as will be described below, the responses may be improved over time.

Figure 6:
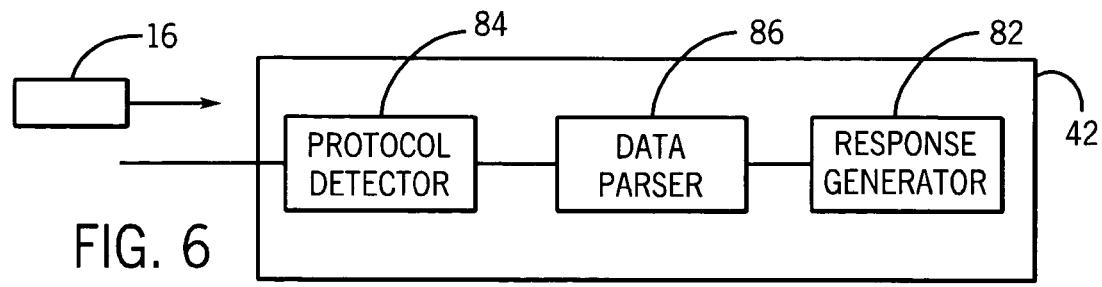
FIG. 6 is an expanded block diagram of the active responder of FIG. 3.

Referring now to FIGS. 2 and 6, the active responder 42 thus includes a response generator 82 that generates a response 17 to a statement 16 under a constrained-state-awareness determined by the limited-awareness window 80. In the preferred embodiment, the response 17 is generated without knowledge of the actual state 52, but by using simple rules or a look-up table, the rules or table taking as an argument only the previous response 17.

The rules used by the response generator 82 may be generated manually by an individual with knowledge of the communication protocol 54 or semi-automatically by analyzing many statements 16 and responses 17 and finding the responses 17 that correlate most highly to each statement 16 or class of statements 16.

Each of these techniques may be expanded for use with a larger limited-awareness window 80 to look at several previous responses 17 simply by adding to the elaborateness of the rules or dimensions of the look-up table.

In the preferred embodiment, accuracy in the response generated by the response generator 82 is increased by identifying the likely protocol of the malicious traffic 36 at a protocol detector 84. The protocol detector 84 most simply may look at the particular port through which the statements 16 were received and use the conventional mapping of ports to protocols. Once the protocol is known, a data parser 86 receiving each statement 16 before it is passed to the response generator 82 may extract particular fields from the statement 16 holding the information likely to be most significant to generating a response 17, as a function of the protocol, allowing more accurate mapping of each statement 16 to a given response by the response generator 82. Further, the protocol may be used in establishing a set of statements 16 that will be treated together for the purpose of generating responses 17 manually or semi-automatically.

Figure 7:
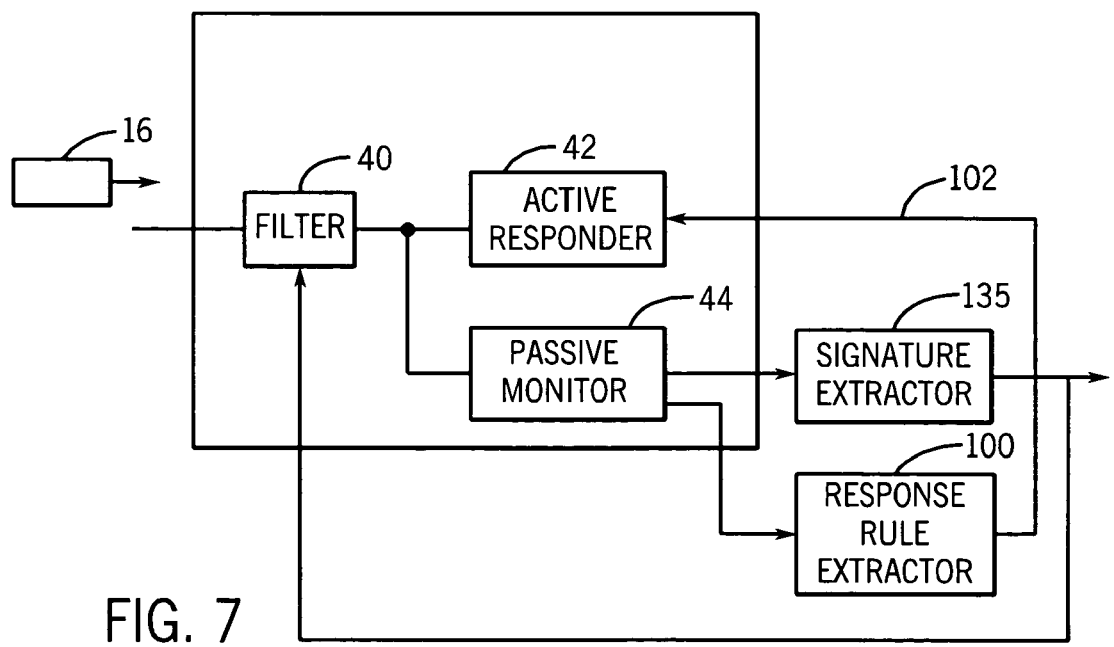
FIG. 7 is a figure similar to FIG. 3 showing an alternative embodiment of the invention in which the filter and active responder are updated by the monitoring process.

Referring now to FIG. 7, in an alternative embodiment, the filter 40 may also serve to block statements 16 associated with signatures of known variants of malicious traffic 36 by providing the output of the signature extractor 35 to the filter 40, which may then act like a conventional NIDS 22 and firewall 26 in combination. In this way, known malicious traffic 36 is eliminated from further monitoring, increasing the availability of the network monitor 30 to find new varieties of malicious traffic. Furthermore, since the filter 40 sees all traffic directed to or coming from the monitor, it can be enhanced with the capability to generate alerts in real-time based on traffic matching a specific pattern or create periodic summaries of activity of the monitor.

Because the active responder 42 does not in fact implement the communication protocol associated with the statements 16, on occasion it will provide a response 17 that is unsuitable and thus causes termination of the connection with the malicious source. Such terminations can be monitored by the passive monitor 44, and a response rule extractor 100 may analyze the responses from the passive monitor 44 offline to alter the rules of the active responder 42 accordingly. Thus for example, in the case where the rules are generated semi-automatically by finding responses 17 that correlate most highly to each statement 16 or class of statements 16, the response rule extractor 100 may select the second most highly correlated response 17 or may subdivide the class of statements to subclasses. In this way, the active responder 42 can be incrementally moved to more and more accurate responses for a variety of different statements 16.

It is specifically intended that the present invention not be limited to the embodiments and illustrations contained herein, but include modified forms of those embodiments including portions of the embodiments and combinations of elements of different embodiments as come within the scope of the following claims.

We claim:

1. A network monitor for malicious network traffic implemented on an electronic circuit executing a stored program, the monitor further comprising:
a network interface for receiving at a plurality of addresses malicious communications from at least one malicious computer, each malicious communication comprised of a series of statements, the statements conforming at least in part to a communication protocol defined by a series of communication states;
a constrained-state-awareness responder creating, for each given statement of the malicious communication at the plurality of addresses, a response communicated to the at least one malicious computer to the given statement of the malicious communication based on the given statement and a given number of previous statements of the malicious communication less than that required to determine a position of the given statement of the malicious communication within the series of communication states of the communication protocol; wherein the responder creates responses to the malicious computer without accurately determining the communication state of the communication protocol for the given statement of the malicious communication, and wherein the responder cannot fully execute the communication protocol; and
a monitor recording the series of statements of the malicious communication for the plurality of addresses.

2. The network monitor of claim 1 wherein the constrained-state-awareness responder creates the response to the at least one malicious computer to the given statement of the malicious communication based on the given statement of the malicious communication and no previous statements of the malicious communication.

3. The network monitor of claim 1 wherein the constrained-state-awareness responder cannot execute the communication protocol but only emulate a subset of it.

4. The network monitor of claim 1 wherein the constrained-state-awareness responder parses the given statement of the malicious communication to extract a subset of the statement of the malicious communication and wherein the response to the given statement of the malicious communication is based on a subset of the given statement of the malicious communication and a subset of the given number of previous statements.

5. The network monitor of claim 4 wherein the constrained-state-awareness responder extracts the subset of the given statement of the malicious communication according the communication protocol.

6. The network monitor of claim 5 wherein the constrained-state-awareness responder receives a port input identification from the network interface indicating the port on which the statements of the malicious communication are received and wherein the constrained-state-awareness responder infers the communication protocol from port input identification.

7. The network monitor of claim 1 further including a filter between the network interface and the constrained-state-awareness responder conditionally limiting the communications.

8. The network monitor of claim 7 wherein the network monitor monitors multiple network addresses, and wherein the filter further limits the communication based on at least one of a source of the given statement of the malicious communication and an address of the network interface.

9. The network monitor of claim 7 further including a filter between the network interface and the constrained-state-awareness responder, the filter including signatures of known malicious communication types limiting the communications once statements of the malicious communication are identified to a signature of a known malicious communication type.

10. The network monitor of claim 1 wherein the network monitors multiple communication endpoints.

11. The network monitor of claim 7 includes the filter further monitors communication passing through the network monitor to generate at least one of: alerts based on communications matching a specified pattern and periodic summaries of communication.

12. The network monitor of claim 1 wherein the network monitor changes the response created by the constrained-state-awareness responder to a given statement of the malicious communication based on a historical analyses of acceptance of the response by a source of the given statement of the malicious communication.

13. A method of monitoring malicious network traffic using an electronic circuit executing a stored program, the method comprising the steps of:
 (a) receiving from malicious computers, malicious communications comprised of a series of statements from a plurality of addresses, the statements conforming at least in part to a communication protocol defined by a series of communication states;
 (b) creating a response communicated to the malicious computers to a given statement of the malicious communication based on the given statement of the malicious communication and a given number of previous statements of the malicious communication less than that required to determine a position of the given statement within the series of communication states of the communication protocol; wherein the creation of the response to the malicious computer does not employ accurate determination of a communication state of the communication protocol for the given statement of the malicious communication, and wherein the created response is limited to responses less than required to fully execute the communication protocol; and
 (c) recording the series of statement of the malicious communication for the plurality of addresses.

14. The method of claim 12 wherein the malicious communications are received over network darkspace.

15. The method of claim 12 wherein the response is based on the given statement of the malicious communication and not previous statements of the malicious communication.

16. The method of claim 12 including the step of parsing the given statement to extract a subset of the given statement of the malicious communication, and wherein the response to the given statement of the malicious communication is based on a subset of the given statement of the malicious communication and a subset of the given number of previous statements of the malicious communication.

17. The method of claim 15 wherein the extracted subset depends on the communication protocol.

18. The method of claim 16 wherein the communication protocol is inferred from port input identification.

19. The method of claim 12 further including the step of filtering out some malicious communications to which responses will not be provided.

20. The method of claim 18 wherein the filtering is based on at least one of a source of the given statement of the malicious communication and an address at which the malicious communications are received.

21. The method of claim 18 wherein the filtering blocks malicious communications of a known malicious communication type.

22. The method of claim 12 wherein the malicious communications are received from multiple addresses.

23. The method of claim 12 further including the step of generating at least one of: real-time alerts are generated when observed traffic activity matches a set of rules, and periodic summaries of observed traffic.

24. The method of claim 12 including the step of changing the response based on a historical analysis of acceptance of the response by a source of the given statement of the malicious communication.

25. The method of claim 12 including the step of extracting signatures from the recorded statements for use in identifying malicious communications.

26. The network monitor of claim 1 wherein the constrained-state-awareness responder creates a response based on the given statement of the malicious communication and a partial state determined from at least one previous statement of the malicious communication.

27. The method of claim 12 wherein the response is based on the given statement of the malicious communication and a partial state determined from at least one previous statement of the malicious communication.

28. The network monitor of claim 1 wherein the constrained-state-awareness responder creates responses to multiple sequential given statements of the malicious communication in a communication protocol based on the given statement of the malicious communication and a given number of previous statements of the malicious communication less than that required to determine a position of the given statement of the malicious communication within the series of communication states of the communication protocol.

* * * * *